Dec. 9, 1930.                H. MEYER                  1,784,493
           VALVE CONTROLLED SWITCH FOR ELECTRIC GRINDERS
                       Filed Aug. 23, 1928
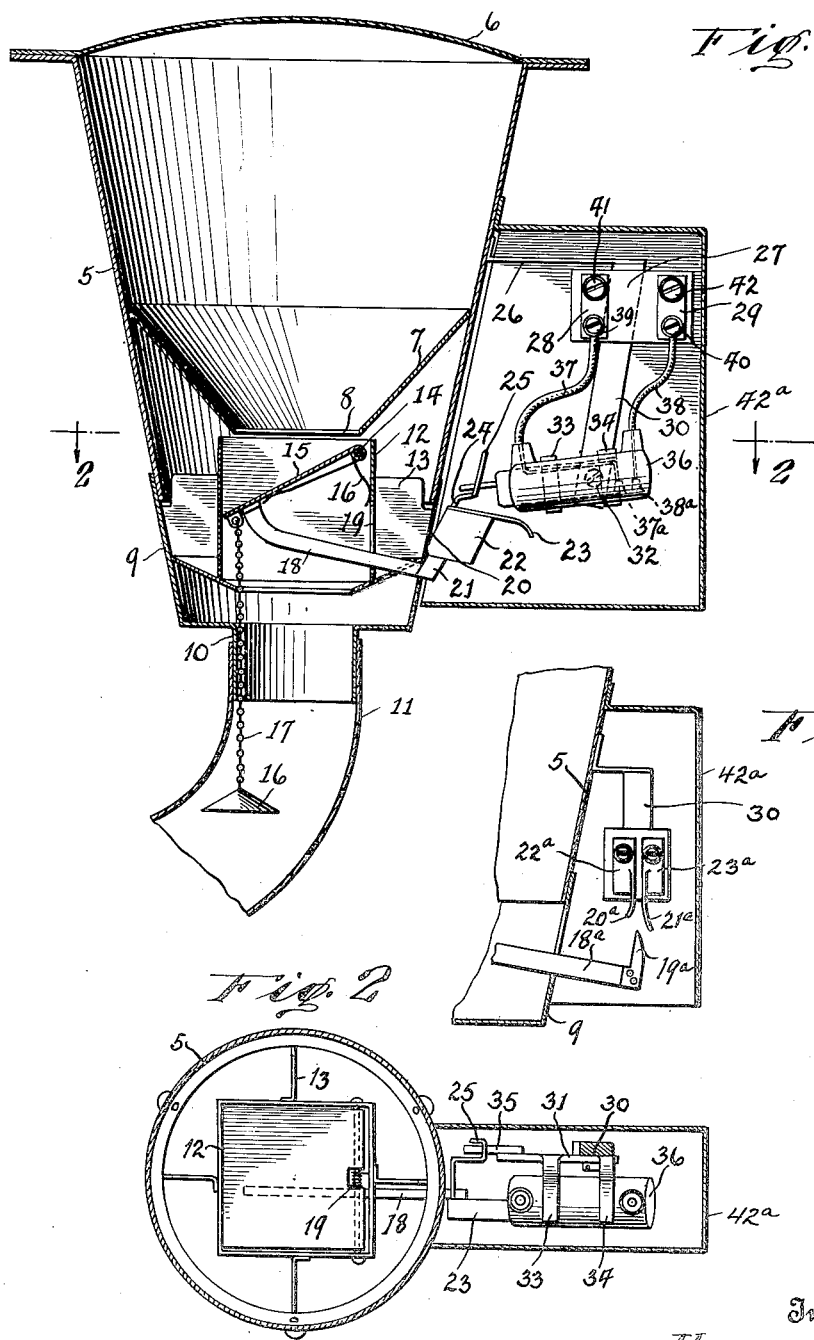
Inventor
Henry Meyer
By his Attorney
Aaron L. Applebaum Patented Dec. 9, 1930

1,784,493

UNITED STATES PATENT OFFICE

HENRY MEYER, OF LONG ISLAND, NEW YORK

VALVE-CONTROLLED SWITCH FOR ELECTRIC GRINDERS

Application filed August 23, 1928. Serial No. 301,670.

This invention relates to improvements in valve controlled switches for electrically driven grinders, mills, separators or other electrically operated machines.

One of the objects of my invention is to provide a valve controlled make and break device in an electric circuit of a motor driven machine including provision whereby the motive power is automatically cut off by said valve.

More specifically my invention relates to an automatic cut off or make and break device operable in conjunction with a balanced valve or door in the outlet of a hopper whereby the position of said valve or door will control the operation of a motor in an electric circuit.

A continued object of my invention is to provide an attachment for the hopper of an electric grinder or mill in which the weight of the material to be ground and position of the outlet valve or door directly controls a circuit leading to a motor for instance whereby the current may be instantly cut off when the hopper is emptied thus economizing on the current and minimizing wear and tear on the mechanism or machinery.

My invention is particularly applicable to electric grinders or mills such as coffee grinders and the like. It is well known that considerable loss of current and unnecessary operation of electric machines results in retail stores in grinding food, such as coffee, by reason of the fact that the machine is permitted to continue to operate after the material is ground due to the carelessness or lack of attention of the clerk in failing to shut off the current promptly. This loss is appreciable during a period of time since the clerk or salesman cannot estimate the time required to grind various quantities and while the material is being ground is otherwise engaged in other work and thus permits the machine to run until the switch is actuated or plug is removed from the socket. My invention therefore aims to instantly interrupt the current leading to the motor and render the grinder or machine inoperative when the food has passed through the valve or door.

To enable others skilled in the art to more fully comprehend the underlying features of my invention, reference is had to the accompanying drawing forming a part of the specification in which Fig. 1 is a vertical sectional view showing my invention.

Fig. 2 is a section taken on the line 2—2 of Fig. 1.

Fig. 3 is a slightly modified form of control switch for the valve or door.

Referring now to the drawings wherein like reference characters designate corresponding parts throughout the several views, 5 designates a conical shaped hopper having a top cover or closeure 6, and 7 is a cone shaped funnel into which the food is poured through the open top of the hopper. Removably attached to the bottom of the hopper and below the outlet 8 of the funnel, I provide a tapered collar 9 having a bottom tubular outlet 10 to which a chute or pipe 11 is connected, and through which the food may fall by gravity to an electric mill or grinder (not shown).

Below the outlet 8 of the funnel, I provide an auxiliary hopper 12, open at its top and bottom and in direct communication with the tubular outlet 10 and the chute or pipe 11 as shown by Fig. 1 of the drawing. The auxiliary hopper may be of any desired shape but slightly larger than the outlet of the funnel through which the food passes. The auxiliary hopper is equipped with brackets or wings 13 preferably connected to the collar 9, so that it may be removed therewith as a unit from the main hopper 5.

The auxiliary hopper is provided with a shaft 14 on which is pivotally mounted a valve or door 15 which is held in its normal or elevated position by a light spring 16. Referring particularly to Fig. 1, it will be noted that the length of the valve or door 15 is somewhat longer than the length or width of the auxiliary hopper so that the said valve or door closing the passage through the auxiliary hopper is disposed at an angle. Attached to the bottom of the valve or door is a counterbalanced cone-shaped weight 16 suspended by a link chain 17, the spring 16 slightly overcoming the downward pull of the weight, thus maintaining the said valve or door in its normally closed position.

Attached to the bottom of the valve or door is an angular lever 18 which is adapted to swing in an arc with the said valve or door, said lever being of a length to extend through an opening or recess 19 in the side of the auxiliary hopper and a similar opening or recess 20 in the wall of the collar. The outer end of the lever 21 carries a weight 22 to which is attached a trip arm 23 and an upwardly extending catch rod 24 having a U-shaped end 25 for a purpose presently to appear.

An L-shaped bracket 26 fastened to the wall of the main hopper carries an insulated block 27 to which is attached contact plates 28, 29 at each side of the block. The arm 30 of the bracket 26 pivotally supports at its lower end a tube holder or cradle 31, pivoted as at 32 and provided with clamping fingers or tongues 33, 34. The tube holder or cradle is equipped with an inwardly directed extension or bar 35 lying in the path of and cooperating with the U-shaped end of the catch rod. The tube holder or cradle and its clamping fingers or tongues support a sealed mercury tube 36 which is of a length to lie in the path of movement of the trip arm 23. The flexible conductors 37, 38 have their terminals 37a, 38a in proximity to each other at one end and within the mercury tube, the opposite terminals of said conductors being attached to binding posts 39, 40 of the respective contact plates 28, 29. A second set of binding posts 41, 42 on the contact plates afford means for connection to other conductors (not shown) included in a circuit to a motor or other electric mechanism of the grinder or mill. The bracket 26, mercury tube and the outer end of lever 18 are all enclosed in a housing 42a attached to the main hopper.

It will be noted, in Fig. 1, that the clamping fingers or tongues and the mercury tube are supported somewhat off center from the pivot 32 so that in its normal position, the mercury tube is slightly inclined, thus permitting the mercury to flow to one end of the tube producing a gap between the terminals 37a, 38a. However, as the trip arm 23 is moved upwardly due to the swinging movement of the valve or door and its connecting lever, the mercury will flow to the opposite end of the mercury tube, thus closing the gap and completing the circuit. When the valve or door again returns to its normal position under the action of the spring 16, the U-shaped end 25 of the catch rod engaging the extension or bar 35 causes the tube holder to return to its angular position, thus breaking the contact between the terminals 37a, 38a.

In the modified form of the invention shown by Fig. 3, the lever 18a connected to the valve or door is equipped with a beveled switch blade 19a adapted to bridge the gap between a pair of resilient contacts 20a, 21a of a pair of spaced contact plates 22a, 23a also attached to the depending arm of the L-shaped bracket to accomplish the same purpose, viz, make and break the circuit upon the operation of the valve or door in the auxiliary hopper. However, in this form of the invention the action is not so positive since there is a slight resistance between the knife blade and the resilient contacts.

The operation of my invention, from the above description and drawing is as follows:—

A quantity of food, such as coffee is poured into the main hopper and funnel with the result that the valve or door swings downwardly actuating the lever and thus tilting the mercury tube making contact and completing the circuit to the motor of the grinder or mill. As the quantity of food diminishes in the auxiliary hopper and the chute or pipe, the spring tends to cause the valve or door to return to its normal position with the result that the weighted lever and the catch rod rocks the mercury tube breaking the contact and closing the circuit. The valve or door is so counter-balanced by the spring and the suspended weight that only a minute quantity of food on the lower end of the valve will maintain the mercury tube tilted and the contact closed and reversely cause the circuit to be broken immediately upon the return of the valve or door when all the food has been released.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:—

1. The combination of a conical hopper having an interior funnel, an auxiliary hopper below the funnel, a shaft and a pivoted balanced valve within the auxiliary hopper, a lever connected at one end to the valve and extending through the auxiliary and main hoppers, a tilting make and break mechanism included in an electric motor circuit mounted on the outside of the main hopper and in the path of movement of the opposite end of the lever whereby said circuit may be maintained closed during any open position of the said valve.

2. The combination of a conical hopper having an interior funnel, an auxiliary hopper below the funnel and within the main hopper, a horizontally pivoted valve within the auxiliary hopper, a spring and balancing weight for said valve, a lever connected at one end to the valve and extending through the auxiliary and main hoppers, a tilting make and break mechanism included in an electric circuit pivotally mounted outside the main hopper, a trip arm on the end of the said lever adapted to engage the tilting make and break mechanism and a catch rod carried by the end of the lever for tilting the make and break mechanism in the opposite direction.

3. The combination of a conical hopper having an interior funnel, a collar attached to the bottom of the main hopper, an auxiliary hopper carried by said collar immediately below the funnel, a balanced flap valve within the auxiliary hopper, a lever connected at one end to the valve and extending outside the collar, a trip arm and catch rod on the outer end of the lever, a tilting make and break device included in an electric circuit pivotally mounted outside the main hopper in the path of movement of the trip arm and catch rod whereby the circuit is maintained closed during an open position of the valve and the circuit maintained open during the closed position of the valve.

In testimony whereof I affix my signature.

HENRY MEYER.